Dec. 16, 1952     L. DI TELLA     2,622,210
STATIC CONVERTER
Filed May 3, 1950
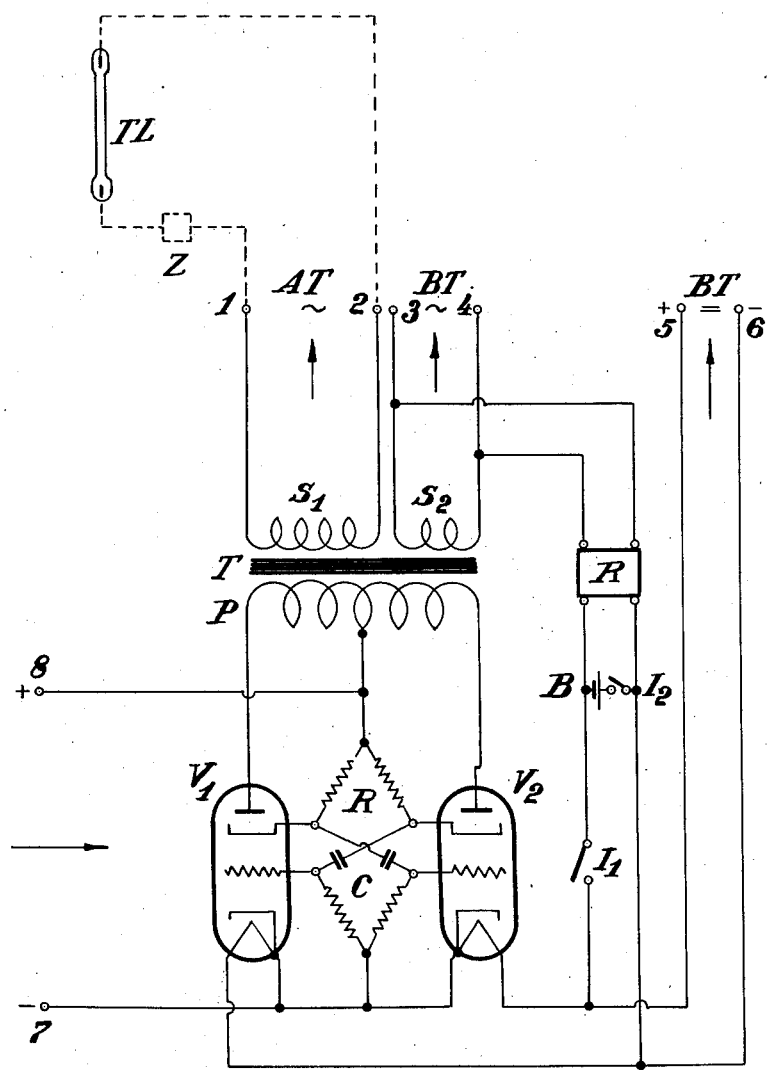
INVENTOR:
LUIGI DI TELLA
By- Wenderoth, Lind & Ponack
ATTORNEYS Patented Dec. 16, 1952

2,622,210

UNITED STATES PATENT OFFICE 2,622,210

STATIC CONVERTER

Luigi di Tella, Trieste, Italy

Application May 3, 1950, Serial No. 159,812
In Italy May 4, 1949

2 Claims. (Cl. 307—26)

This invention relates to a static electrical converter for converting direct current to alternating current and to another direct current having different voltage and strength.

An object of this invention is to provide a static electrical converter, preferably mounted on railway or tramway cars driven by direct current supply, by means of which it is possible to transform the supply direct current partly to high tension alternating current adapted to operate fluorescent tubes and partly to low tension direct current adapted to operate the auxiliary plants which are normally operated by batteries of accumulators.

It is another object of the invention to provide a static converter of reliable working characteristics and of high yield adapted to the low powers wherein the oscillations generated by an improved multivibrator are sent to a primary circuit of a transformer in the secondary circuit of which alternating current is produced, a portion of which is generated at high tension and directly utilized for lighting or advertising purposes, while another portion is generated at a low tension which may be directly utilized or rectified to direct current for being utilized both directly for auxiliary plants and for charging batteries of accumulators.

In order that the invention may be more clearly understood and readily carried into effect, it will now be described more fully with reference to the accompanying diagrammatic drawing showing an electrical circuit according to the teachings of the present invention.

The circuit represented in the single figure comprises two electron valves, pentodes, $V_1$ and $V_2$ wherein the grid and screen grid are interconnected by means of capacitors C and resistances R.

The anodes of the two pentodes are connected to the primary circuit P of a transformer T which comprises two secondary circuits $S_1$ and $S_2$. The circuit $S_1$ is arranged for generating high tension alternating current and the circuit $S_2$ is arranged for generating low tension alternating current.

The high tension alternating current is utilized at the terminals 1 and 2 for feeding, through a reactor Z, a fluorescent tube TL.

The low tension alternating current generated by the secondary circuit $S_2$ may be directly utilized at the terminals 3 and 4. The low tension alternating current generated by the secondary circuit $S_2$ may be fed to a rectifier, schematically indicated at R, to obtain low tension rectified current which is directly utilized at the terminals 5 and 6. The rectified current, from the rectifier R, may be utilized for charging a battery of accumulators B inserted in the circuit, which in turn is utilized for starting up the converter.

When the direct current is applied to the terminals 7 and 8, the valves $V_1$ and $V_2$ are not lighted, but they are lighted by closing switches $I_1$ and $I_2$; then the multivibrator emits oscillations which are amplified and transmitted by the anodes of the pentodes to the primary circuit P of the transformer T.

After the converter is started switch $I_2$ may be opened and the converter continues to operate without the battery B owing to the voltage applied to the terminals 7 and 8.

The frequency generated by the oscillating circuit depends on the values of the time constant (R, C) of the resistances and of the capacities inserted therein in a known manner.

The described circuit has a very high output as the valves are self-controlled in respect to the grid as well as the screen grids.

I claim:

1. A static converter of direct current to alternating current and direct current having a different voltage and intensity comprising in combination in an electric circuit means for emitting electrical oscillations, means for converting said oscillations to high tension alternating current and to low tension alternating current, means for rectifying the low tension alternating current, means for directly and separately utilizing the hight tension alternating current, the low tension alternating current and the low tension direct current generated by the converter means.

2. A static converter of direct current to alternating current and direct current having a different voltage and intensity, comprising in an electric circuit a supply source of direct current, an oscillating circuit fed by the direct current formed of two pentodes, the grid and screen grids of which are interconnected by resistances and capacitors, a primary circuit of a transformer connected to the anodes of the said pentodes and adapted to receive the oscillations generated by the said oscillating circuit, a secondary circuit of said transformer formed of two portions one of which is adapted to generate high tension alternating current and the other adapted to generate low tension alternating current, a current rectifier for low tension alternating current inserted in the secondary circuit of the transformer, a battery of accumulators adapted to be connected to the said rectifier to be charged with low tension direct current coming from the rectifier, the high tension alternating current, the low tension alternating current and the low tension direct current being directly and separately utilized at the relevant terminals, starting of the converter being obtained by means of low tension direct current coming from the battery of accumulators.

L. DI TELLA.

No references cited.